United States Patent
Vigna (10) Patent No.: US 11,301,241 B2
(45) Date of Patent: Apr. 12, 2022

(54) ENTERPRISE REPORTS, ERROR HANDLER AND AUDITS COMPARTMENTALIZED BY WEB APPLICATION

(71) Applicant: David Michael Vigna, Sterling, VA (US)

(72) Inventor: David Michael Vigna, Sterling, VA (US)

( * ) Notice: Subject to any disclaimer, the term of this patent is extended or adjusted under 35 U.S.C. 154(b) by 8 days.

(21) Appl. No.: 15/929,388

(22) Filed: Apr. 30, 2020

(65) Prior Publication Data

US 2020/0401471 A1    Dec. 24, 2020

Related U.S. Application Data

(60) Provisional application No. 62/862,997, filed on Jun. 18, 2019.

(51) Int. Cl.
| | | |
|---|---|---|
| G06F 11/36 | (2006.01) | |
| G06F 8/77 | (2018.01) | |
| G06F 9/44 | (2018.01) | |
| G06F 8/70 | (2018.01) | |
| G06F 11/07 | (2006.01) | |
| G06Q 10/06 | (2012.01) | |
| G06F 8/00 | (2018.01) | |
| H04L 67/02 | (2022.01) | |

(Continued)

(52) U.S. Cl.
CPC ............ *G06F 8/70* (2013.01); *G06F 8/00* (2013.01); *G06F 11/0769* (2013.01); *G06F 11/362* (2013.01); *G06Q 10/06311* (2013.01); *G06F 3/0482* (2013.01); *G06F 8/31* (2013.01); *G06F 8/34* (2013.01); *G06F 11/0709* (2013.01); *G06F 11/0712* (2013.01); *G06F 11/0784* (2013.01); *H04L 67/02* (2013.01)

(58) Field of Classification Search
CPC ..... G06F 8/70; G06F 8/00; G06F 8/31; G06F 8/34; G06F 8/24; G06F 3/0482; H04L 67/02; H04L 67/16; G06Q 10/06311; G06Q 10/06; G06Q 10/10
See application file for complete search history.

(56) References Cited

U.S. PATENT DOCUMENTS

| | | |
|---|---|---|
| 5,594,861 A | 1/1997 | Jonsson et al. |
| 6,598,179 B1 | 7/2003 | Chirashnya et al. |

(Continued)

OTHER PUBLICATIONS

Bhanu Pratap Yadav, Web Application Vulnerabilities, Apr. 23, 2014, [Retrieved on Sep. 28, 2021]. Retrieved from the internet: <URL: https://www.theseus.fi/bitstream/handle/10024/76033/yadav_bhanu.pdf?sequence=1> 61 Pages (1-53) (Year: 2014).*

*Primary Examiner* — Anibal Rivera
(74) *Attorney, Agent, or Firm* — Dunlap Bennett & Ludwig, PLLC (57) ABSTRACT

A method and system for implementing an enterprise error handler and audit module for a web application. The method framework approach embodied in the present invention provides a site-wide error handler and audit for web applications on multiple servers across an enterprise with compartmentalized error and audit reports per application. The present invention focuses on software development user interface and user responses, and so teaches error details and audits from clients to support troubleshooting for different development teams.

2 Claims, 7 Drawing Sheets

(51) Int. Cl.
    *G06F 3/0482*     (2013.01)
    *G06F 8/30*     (2018.01)
    *G06F 8/34*     (2018.01)

(56) References Cited

U.S. PATENT DOCUMENTS

| | | |
|---|---|---|
| 7,080,287 B2 | 7/2006 | Salem |
| 7,343,529 B1 | 3/2008 | Klinkner et al. |
| 8,713,350 B2 * | 4/2014 | Walton ................. G06F 11/0793 |
| | | 714/3 |
| 9,389,940 B2 | 7/2016 | Larson et al. |
| 9,645,874 B2 | 5/2017 | Tran |
| 9,674,287 B2 * | 6/2017 | Ladd ....................... H04L 67/16 |
| 9,823,994 B2 * | 11/2017 | Altman ................ G06F 11/0706 |
| 10,083,118 B2 * | 9/2018 | Jeong ................... G11C 15/046 |
| 2002/0065855 A1 | 5/2002 | Meyers et al. |
| 2003/0028803 A1 | 2/2003 | Bunker et al. |
| 2003/0041291 A1 | 2/2003 | Hashem et al. |
| 2006/0020641 A1 | 1/2006 | Walsh et al. |
| 2006/0143267 A1 | 6/2006 | Smithline et al. |
| 2006/0195745 A1 | 8/2006 | Keromytis et al. |
| 2006/0282897 A1 | 12/2006 | Sima et al. |
| 2007/0174731 A1 | 7/2007 | Haeberle et al. |
| 2007/0256114 A1 | 11/2007 | Johnson et al. |
| 2009/0006883 A1 | 1/2009 | Zhang et al. |
| 2011/0035371 A1 | 2/2011 | Pong et al. |
| 2011/0138219 A1 * | 6/2011 | Walton ................. G06F 11/0712 |
| | | 714/3 |
| 2012/0198288 A1 | 8/2012 | Njo et al. |
| 2017/0177461 A1 * | 6/2017 | Altman ................ G06F 11/0706 |
| 2018/0052764 A1 * | 2/2018 | Kaser .................. G06F 11/3692 |

\* cited by examiner

| Adobe ColdFusion 2016 Release Administrator ☆ | ◎ ◎ ? | LOGOUT

Server: cfusion
Expand All / Collapse All

▼ SERVER SETTINGS
  Settings
  Request Tuning
  Caching
  Client Variables
  Memory Variables
  Mappings
  Mail
  Scheduled Tasks
  WebSocket
  Charting
  Font Management
  Document
  Java and JVM
  Settings Summary
▼ DATA & SERVICES
  Data Sources
  ColdFusion Collections
  Solr Server
  Web Services
  REST Services
  Flex Integration
  PDF Service
▲ DEBUGGING & LOGGING
▼ SERVER MONITORING Application.cfc/Appplication.cfm lookup order
  ● Default order
  ○ Until Webroot
  ○ In Webroot Specify the option ColdFusion should use to search for an Application.cfc/Application.cfm if it is not found in the current folder.
By default, ColdFusion will search until the system root.

Error Handlers

Missing Template Handler [         ]

Specify the relative path to the template to execute when ColdFusion cannot find a requested template.

Site-wide Error Handler [         ]

Specify the relative path to the template to execute when ColdFusion encounters errors while processing a request.

Request Size Limits

Maximum number of POST request parameters [100]

Maximum number of parameters in a POST request sent to the server. ColdFusion rejects if the POST parameters exceed the limit you specify.

Maximum size of post data [20] MB

Maximum number of parameters in a POST request sent to the server. ColdFusion rejects if the POST parameters exceed the limit you specify.

Maximum Throttle Treshold [4] MB

Request smaller than the specified limit are not handled by the throttle.

ENTERPRISE REPORTS, ERROR HANDLER AND AUDITS COMPARTMENTALIZED BY WEB APPLICATION

CROSS-REFERENCE TO RELATED APPLICATION

This application claims the benefit of priority of U.S. provisional application No. 62/862,997, filed 18 Jun. 2019, the contents of which are herein incorporated by reference.

BACKGROUND OF THE INVENTION

After researching the market for a product that could provide separate error and audit details by application to different development teams without any data leakage, the inventor developed a framework for reporting of sensitive data adapted to provide separate error and audit details by application. In turn, the present invention resulting is highly sensitive variable data customizable to specific applications and retrievably storable within Oracle or other databases or data sources.

When capturing server, client or client certificate and custom variables there is Highly Sensitive data that is captured. Sensitive data for servers is not only limited to Server Names, Internal IP addresses, Operating system and Patch levels. Client variables may include IP address, userid may be emails, or other personally identifiable information. Client certificates also include information about the client-specific information provided by the web server. This data typically includes the client's name, e-mail address and the issuer information may include the authority that provided the client cert with the trust network. This is far more information that is needed to export for the average bug fix.

This patent allows for the clients to define capturing custom variables. An example could be, but not limited to url, form or session scoped variables. Those client defined variables may be defined to include variables that store personal information, education records, card holder data etc. which is too sensitive to provide to a remote development team. I allow for each field to be checked or unchecked during export to allow a trusted user to export only the fields needed for the error or audit export details. Selecting which fields are included in the export this helps the admin or power user define which fields are include to a developer, contractor, outsourced remote development team or auditors.

There are numerous legacy web sites and web applications that are being updated to a more modern look and feel. Those legacy web sites could be used to display simple content, table grid data, charts or create complex dashboards. The present invention relates to a need for enterprise whole site error handler and access audits of web applications across multiple servers or single servers with multiple applications supported by different server administrators and different development teams.

Most for the modern frameworks and libraries focus on the method developer's code and the method of developing the applications. They may focus on object-oriented programming, modules or model view controller methods or libraries for rendering web pages elements or charts on a page.

The present invention addresses easy to read error details that are exportable and attachable to a ticketing system and for tracking and trending of issues to prioritize bug fixes with system's support. Included are audit reports for compliance and audit review that may be needed for ongoing maintenance and support and accreditation of systems with sensitive data.

It should be understood, that even though the instant specification discloses the present invention in the context of an Adobe™ ColdFusion™ web server, the present invention is applicable to a wide array of web development systems. Likewise, the present invention is not limited to just CFML as CFML is only exemplary in order to demonstrate the methods and need for a different approach in the creation of web development frameworks.

There are ColdFusion frameworks like Cold Box, Framework) and CF Wheels just to name a few that use a modular architecture for a more modern development approach. JavaScript libraries are also being used to update the look a feel of the web sites. Those libraries may include a combination of Angular, Bootstrap jQuery, Node, React and charting libraries. Data sources are no longer limited to database tables or flat files but may include JSON, APIs or scripting languages like C #, JAVA, Python to pull data to display on pages.

Those frameworks focus the development phase of the application and the developer coding the application with event handlers for user interactions and responses. Error handling and auditing can be lacking and is an afterthought of some of the frameworks. More important to the maintenance and support is trying to prioritize fixing errors and securing of a legacy system which can be poorly coded and a hodgepodge of different developers using a combination of legacy and modern programming methods, multiple scripting languages and different JavaScript libraries.

The method framework approach embodied in the present invention focuses on software development user interface and user responses, their inherent exception handling and debugging features leave a lot to be desired.

Unfortunately, site-wide error handlers, like IronGate™, do not support Oracle and only work on a single server without any grouping of application errors and no export function. Fusion Reactor™ provides java stack trace information which is very detailed but complex to read, especially for the non-technical user.

As can be seen, there is a need for a simple solution to provide error details and audits from clients to support troubleshooting for different development teams.

SUMMARY OF THE INVENTION

In one aspect of the present invention, a method of implementing an enterprise error handler and audit module for web applications includes the following: registering one or more custom variables to the error and audit application, enabling identification of a specific application that created the error or audit trail allowing for the compartmentalized of reporting to the development team. This also allows for a reporting framework to be defined for different groups based on customs variables within each applications configuration files; and each custom variable is configured to associate one or more data sources with each application.

In another aspect of the present invention, the above-mentioned method further includes associating a database with the framework; capturing each executed error handler or audit trail for each application, wherein the one or more data sources comprise servers and development environments; assigning one or more roles to each user of each application; wherein each custom variable is configured to map each role to said identified error or audit; and providing a menu for filtering each executed error handler or audit captured in said database by at least one of the following: by role and by development environment.

These and other features, aspects and advantages of the present invention will become better understood with reference to the following drawings, description and claims.

BRIEF DESCRIPTION OF THE DRAWINGS

FIG. 5 is a diagram of where to define the Site-wide Error Handler with the ColdFusion Admin page.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a site-wide error handler and audit for web applications on multiple servers across an enterprise with compartmentalized error and audit reports per application. Oracle and other types of databases may be the data source.

Figure 1:
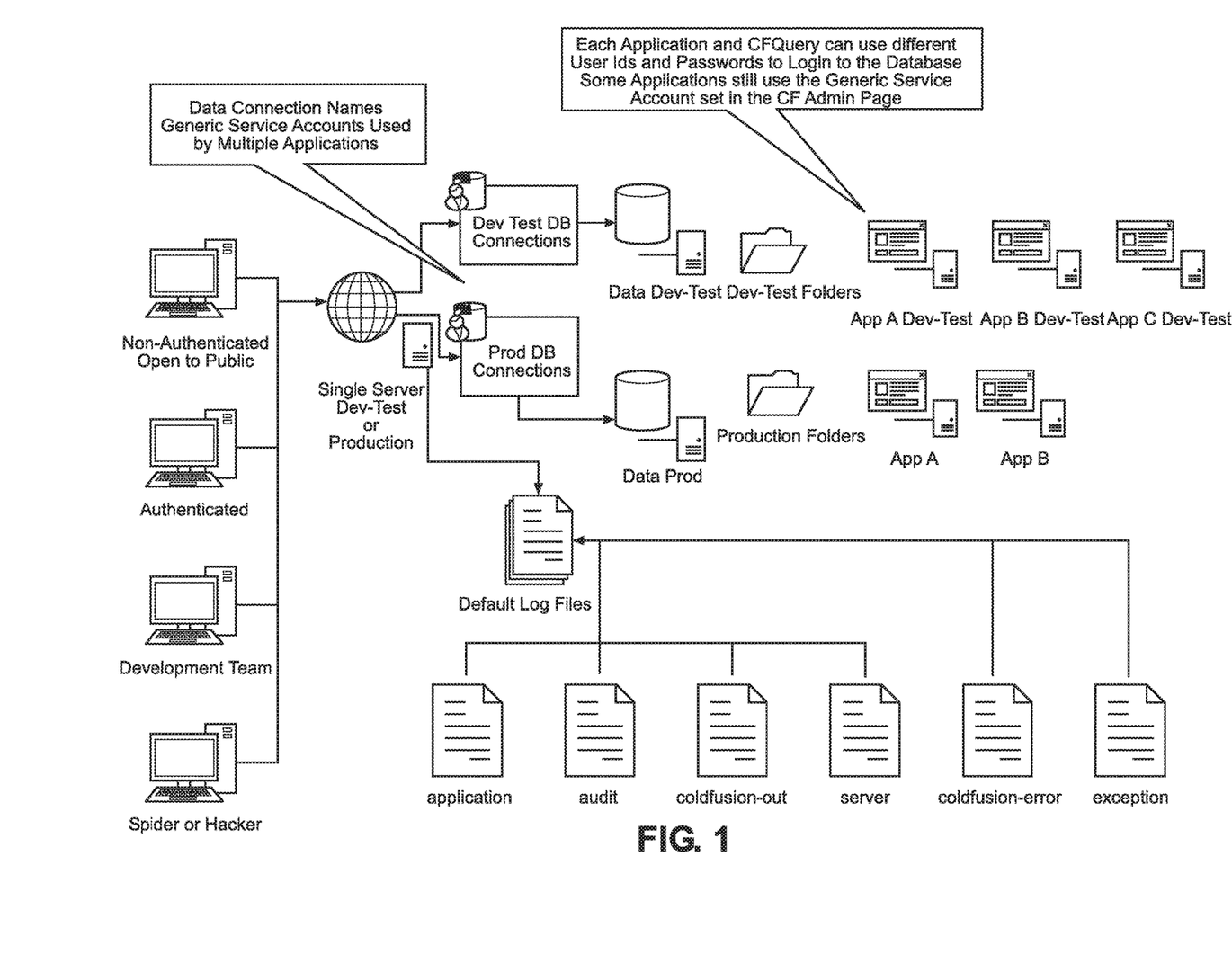
FIG. 1 is a diagram of a ColdFusion server's Default Log Files.

Referring to FIG. 1, the standard default settings for ColdFusion is to log all errors in every application on the server by default into the same error log file. The error log files contain very limited error information. This is not always enough information to help the development team fix the error. There is a debugger that the development teams use to provide more details about the application errors. For production servers this debugger is recommended to be turned off for security reasons due to the highly sensitive variable data that the debugger can display to end users.

Figure 2:
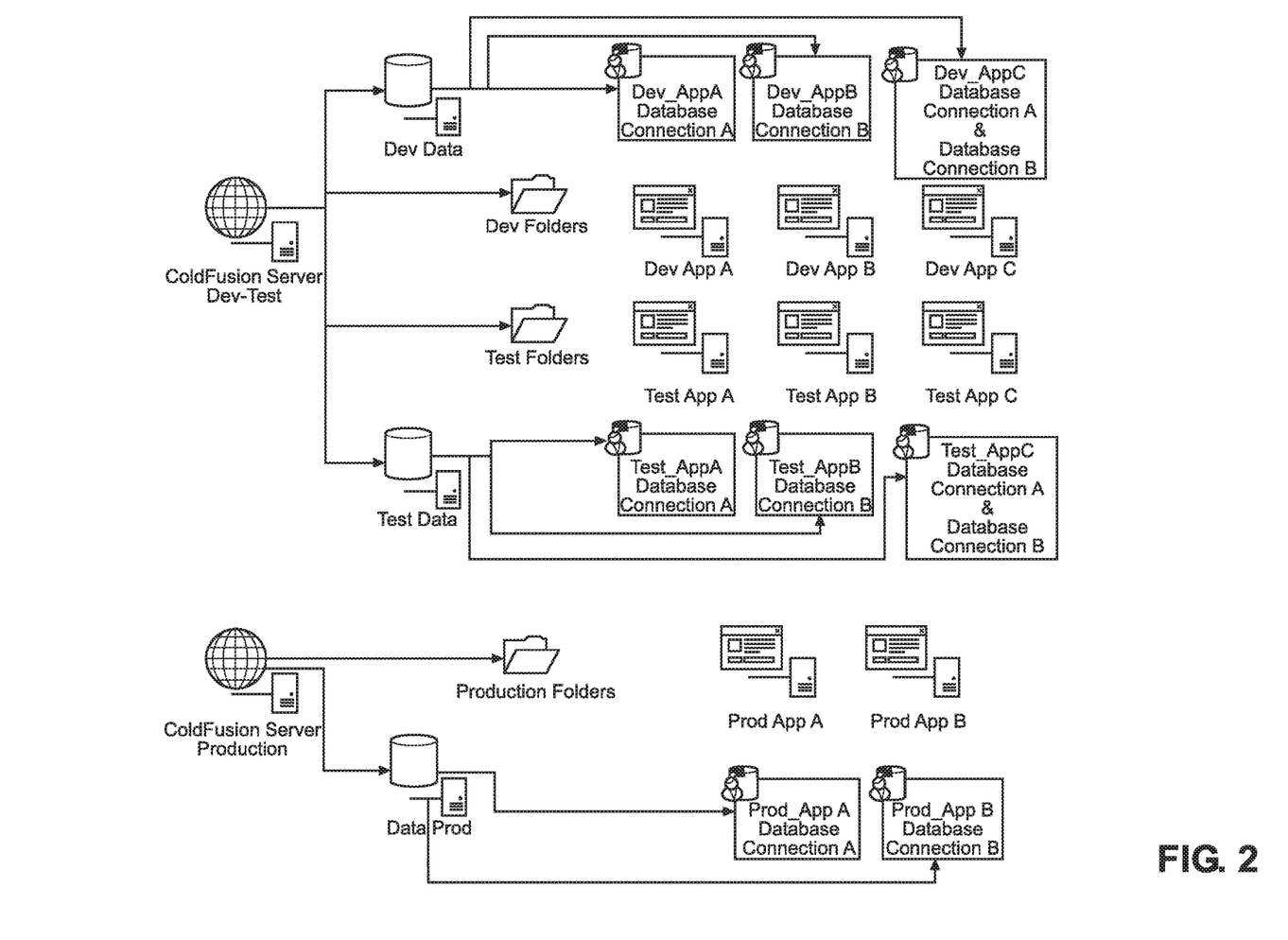
FIG. 2 is a diagram of Data Source Connections with a generic service account.

Referring to FIG. 2, another issue is service accounts are sometimes used to connect to data sources and this creates issues with tracking which user connected to the data source and created the error. Some applications may use one data connection or multiple data sources. This information is not captured within the error log file and makes it hard to figure out who created the error and if the error is based on a missing security role or someone trying to hack into the system.

Figure 3:
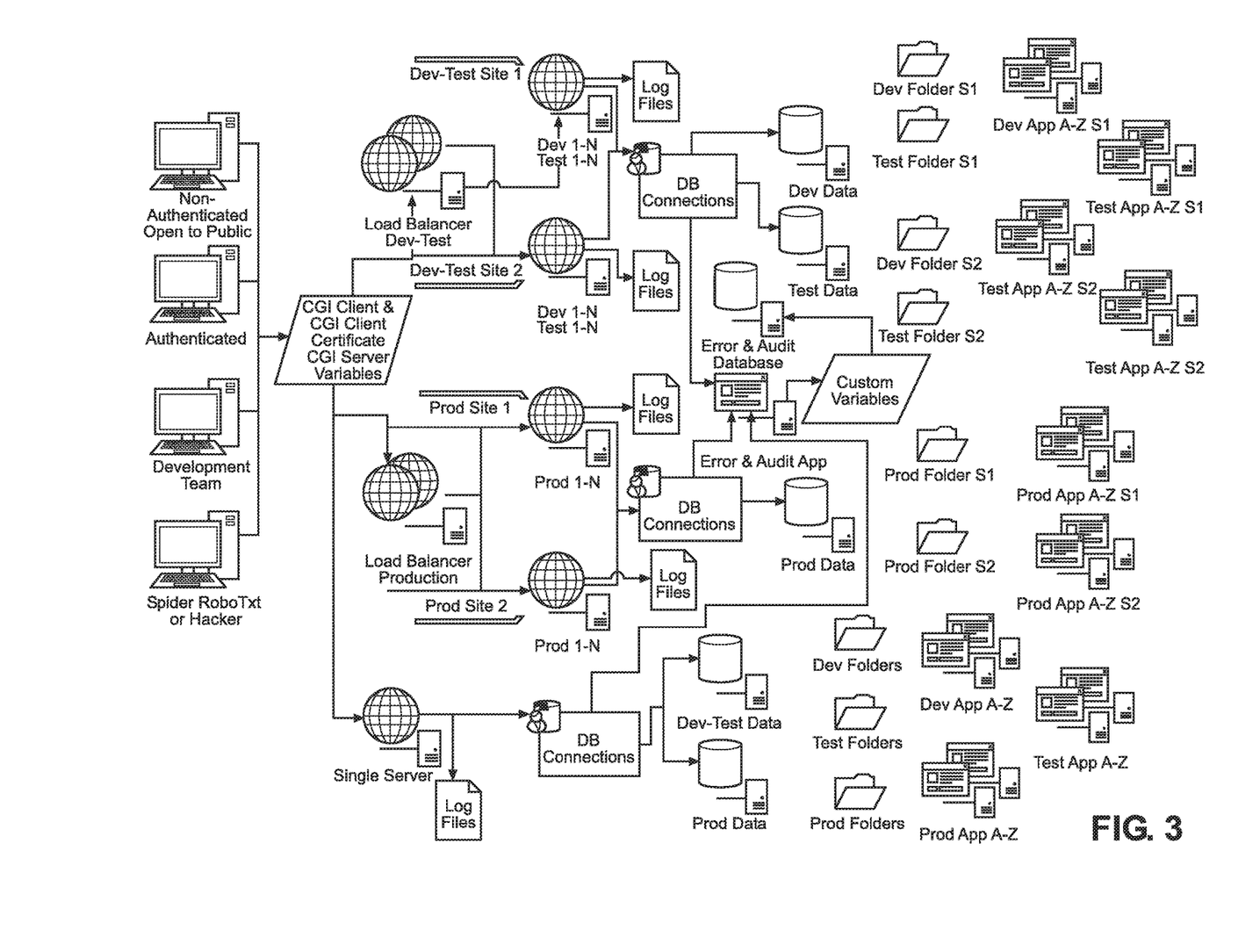
FIG. 3 is a diagram of Error and Audit Logging into a Database capturing application mapped custom variables.

FIG. 3 illustrates the capture of errors and audits of file access with custom variables mapped and the data flow for multiple applications with load balanced servers or a single server with different environments. A module of ColdFusion pages captures all CGI, Custom Session and CF Error Variables. Variables have been added to identify different servers, different application names and development environments. Those variables are used to filter or group and report by application.

Figure 4A:
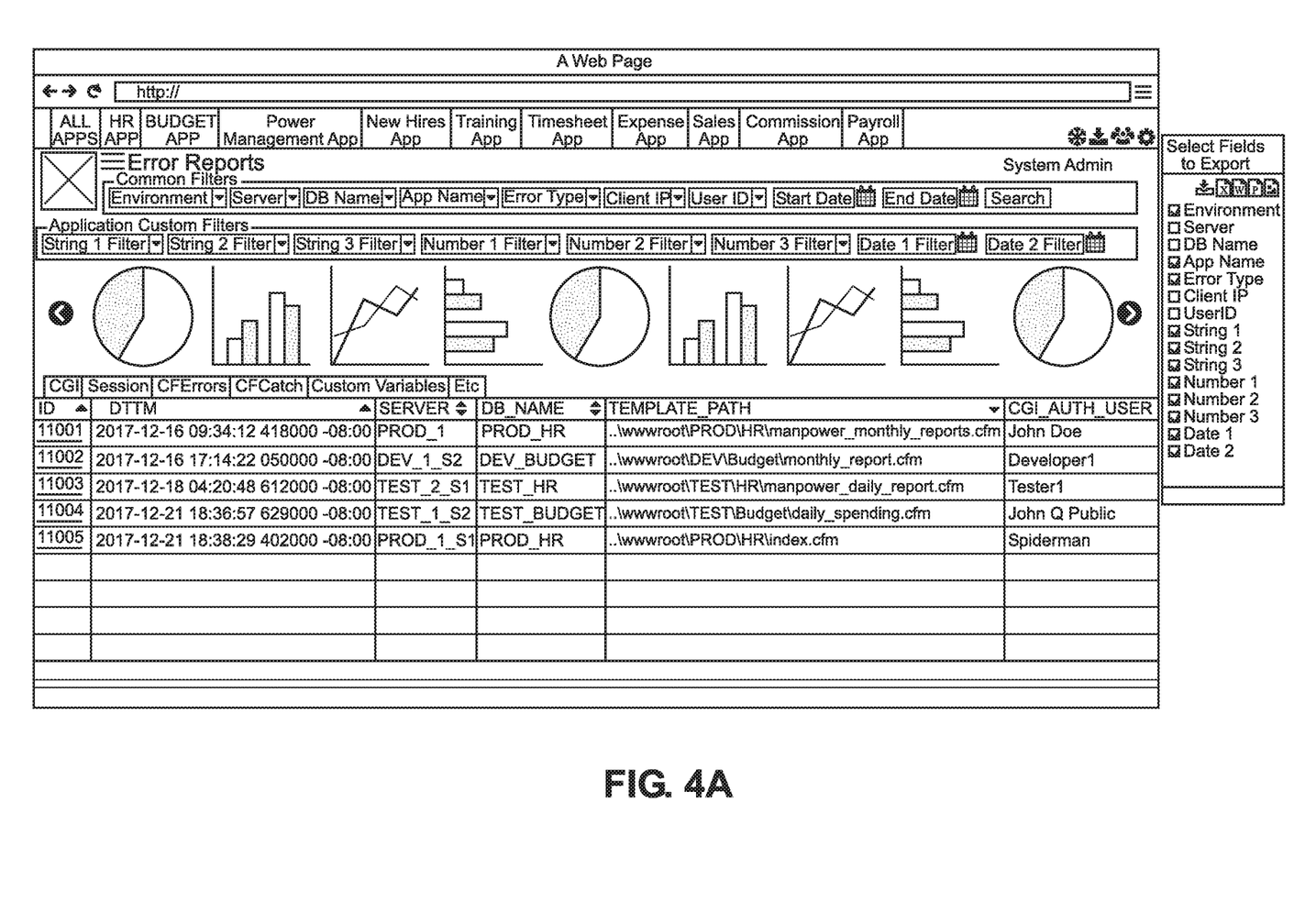
FIG. 4A is a diagram of a Dashboard (System Admin)

FIG. 4A includes a Dashboard (System Admin). The Dashboard allows for the reports to be aggregated across multiple servers or isolated down to a single application with detailed custom mapped variables. This information can be exported to help development teams debug issues.

Figure 4B:
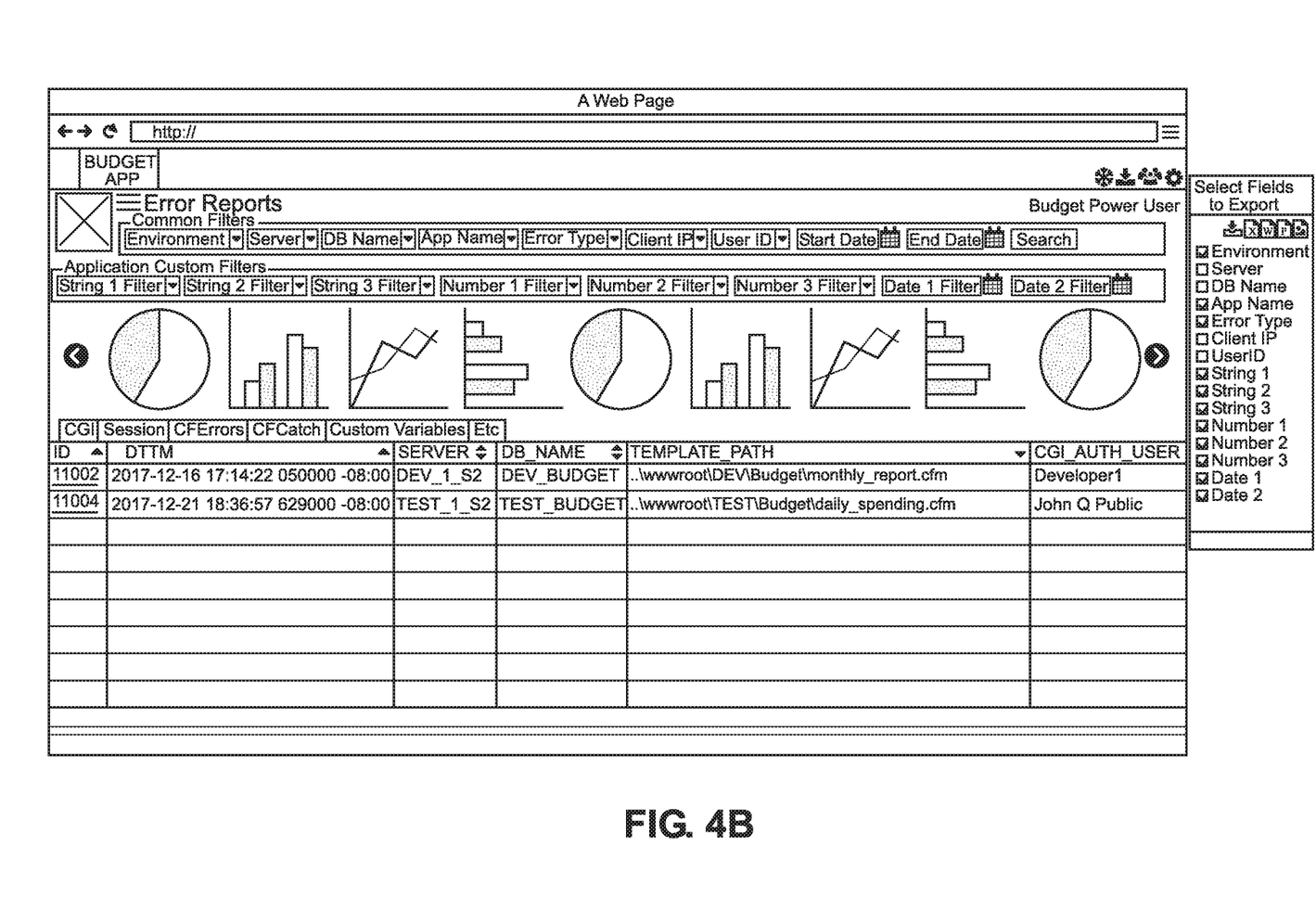
FIG. 4B is a diagram of a Dashboard (Power User—Budget Application)
Figure 6:
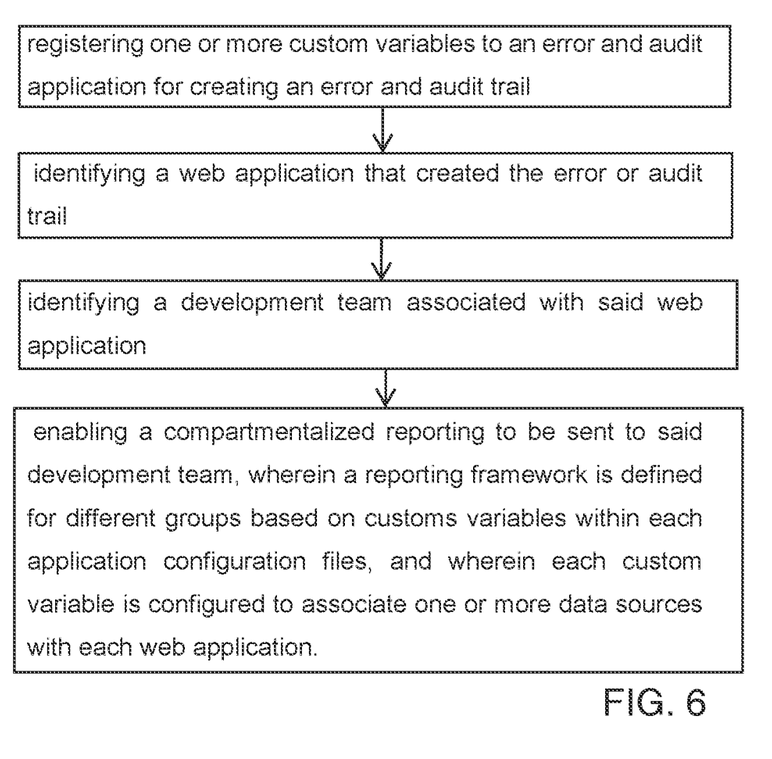
FIG. 6 is a flowchart of an exemplary embodiment of the present invention, illustrating a method for implementing an enterprise error handler and audit module for a web application.

FIG. 4B includes a Dashboard (Power User—Budget Application), including a wireframe mockup of the Error Report. By creating a secondary Menu each application can allow for custom filters of custom mapped variable data. Each application can have a System Admin or Power User login and review their own Application for Errors. This also provides Application owners on-site to export errors or audit reports that can be provided to an off-site development team.

FIG. 5 illustrates where to define the Site-wide Error Handler in the ColdFusion Admin Page. ColdFusion allows a developer to create a custom error handling page and provides a form to define the file path for custom Site-wide Error page. The module of the present invention allows the local developers to provide more detailed error information for bug fixes. By adding extra session variables for application error handling and access controls for users, the present invention may restrict aggerate reporting to only the teams responsible for each application. The errors can be reviewed by users for each application.

The present invention may include the following: a variable file to map custom variables for each application to capture, wherein the error or audit variables are captured and inserted into the database tables; roles are created for each application and assigned to the users responsible for that application; a dashboard displays application errors and allows for filtering of common variables and custom application variables; and the dashboard allows for the export of errors or audits that can be provided to the development team for debugging.

A method of making the present invention may include creating a module and ColdFusion pages and scripts that capture the audit and error and custom mapped variables by application. Tables are created for capturing audits and errors and mapped custom variables for each application. Forms are created to configure and enter the mapping of users to roles for each application. Reports with custom filters may be created for exporting audits and errors for each of the different applications. The Server Admin needs to enable CGI on the web server. The Server Admin/ColdFusion developer adds a few custom Session variables into the Application.cfm or Application.cfc files. The database admin creates an application service user in the database and runs the database scripts to generate the tables. The Server Admin need to configure the database connection and define the path for the Site-wide Error Handler within the ColdFusion Admin page.

Forms are created for defining Application Names and Role Names and mapping Applications to Roles. Forms are used to map users to roles. FIGS. 4A & 4B display two different users with different roles a System Admin with all application access and a Power User with only the Budget Application access. Custom Error fields are mapped and defined for a Secondary Menu Filter per application; and Export fields can be defined per Role.

The ordered combination of various ad hoc and automated tasks in the presently disclosed platform necessarily achieve technological improvements through the specific processes described more in detail below. In addition, the unconventional and unique aspects of these specific automation processes represent a sharp contrast to merely providing a well-known or routine environment for performing a manual or mental task.

It should be understood, of course, that the foregoing relates to exemplary embodiments of the invention and that modifications may be made without departing from the spirit and scope of the invention as set forth in the following claims.

What is claimed is:

1. A method for implementing an enterprise error handler and audit module for a web application, comprises:
    registering one or more custom variables to an error and audit application for creating an error handler and audit trail;
    identifying a web application that created the error or audit trail;
    identifying a development team associated with said web application;
    enabling a compartmentalized reporting to be sent to said development team, wherein a reporting framework is defined for different groups based on customs variables within each application configuration files, and wherein each custom variable is configured to associate one or more data sources with each web application;
    associating a database with said reporting framework;
    capturing each executed error handler or audit trail for each web application, wherein the one or more data sources comprise servers and development environments;
    assigning one or more roles to each user of each web application, wherein each custom variable is configured to map each role to said error handler or audit trail; and
    providing a menu for filtering each executed error handler or audit captured in said database by at least one of the following: by role and by development environment.

2. A system for implementing an enterprise error handler and audit module for a web application, comprises:
    a hardware processor;
    a memory electrically connected to the hardware processor;
    one or more web applications operatively associated with the hardware processor;
    an enterprise error handler and audit module operatively associated with each web application;
    a variable file configured to map custom variables for capturing each executed error handler or audit trail for each web application, wherein an error or audit variables are captured and inserted into one or more database tables;
    roles created for each user of each web application and assigned to a development team responsible for said web application; and
    a dashboard configured to display application errors, to allow filtering of custom web application variables, and to the errors or audits variables to the development team for debugging.

* * * * *